(12) United States Patent
Mun et al.

(10) Patent No.: US 9,953,654 B2
(45) Date of Patent: Apr. 24, 2018

(54) VOICE COMMAND RECOGNITION APPARATUS AND METHOD

(71) Applicant: Samsung Electronics Co., Ltd., Suwon-si (KR)

(72) Inventors: Min Young Mun, Seoul (KR); Young Sang Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 180 days.

(21) Appl. No.: 14/616,270

(22) Filed: Feb. 6, 2015

(65) Prior Publication Data

US 2015/0340040 A1 Nov. 26, 2015

(30) Foreign Application Priority Data

May 20, 2014 (KR) .................. 10-2014-0060559

(51) Int. Cl.
| | |
|---|---|
| *G10L 17/00* | (2013.01) |
| *G10L 17/22* | (2013.01) |
| *G10L 25/03* | (2013.01) |
| *G10L 25/78* | (2013.01) |
| *G10L 15/22* | (2006.01) |

(52) U.S. Cl.
CPC .............. *G10L 17/22* (2013.01); *G10L 15/22* (2013.01); *G10L 25/03* (2013.01); *G10L 25/78* (2013.01); *G10L 17/00* (2013.01); *G10L 2015/223* (2013.01); *G10L 2015/227* (2013.01)

(58) Field of Classification Search
CPC ....... G10L 15/22; G10L 15/265; G06F 3/167; H04M 2201/40

USPC ......................................... 704/275
See application file for complete search history.

(56) References Cited

U.S. PATENT DOCUMENTS

| | | | |
|---|---|---|---|
| 5,983,186 A | 11/1999 | Miyazawa et al. | |
| 6,219,645 B1 * | 4/2001 | Byers ................. | G10L 15/02 381/91 |
| 8,046,223 B2 | 10/2011 | Jin et al. | |
| 8,473,289 B2 | 6/2013 | Jitkoff et al. | |
| 2006/0089834 A1 | 4/2006 | Mowatt et al. | |
| 2006/0192775 A1* | 8/2006 | Nicholson ........... | A61F 4/00 345/211 |
| 2011/0208524 A1* | 8/2011 | Haughay ............. | G10L 15/22 704/246 |
| 2012/0004909 A1 | 1/2012 | Beltman et al. | |
| 2012/0035935 A1 | 2/2012 | Park et al. | |
| 2012/0136667 A1 | 5/2012 | Emerick et al. | |
| 2012/0173244 A1 | 7/2012 | Kwak et al. | |

(Continued)

FOREIGN PATENT DOCUMENTS

| | | |
|---|---|---|
| JP | 2011-81541 A | 4/2011 |
| KR | 10-030045 B1 | 6/2002 |

(Continued)

*Primary Examiner* — Jesse Pullias
(74) *Attorney, Agent, or Firm* — NSIP Law

(57) ABSTRACT

A voice command recognition apparatus and method thereof are described. The voice command recognition apparatus includes audio sensors placed at different locations; a context determiner configured to determine user context based on a voice received at the audio sensors, wherein the context comprises a vocalization from a user. A command recognizer in the voice command recognition apparatus is configured to activate to recognize a voice command or remain inactive according to the recognized context.

17 Claims, 14 Drawing Sheets

(56) References Cited

U.S. PATENT DOCUMENTS

| | | |
|---|---|---|
| 2012/0316879 A1 | 12/2012 | Jung et al. |
| 2013/0040611 A1 | 2/2013 | Rega et al. |
| 2013/0317830 A1* | 11/2013 | Visser .................. G10L 19/00 704/500 |
| 2014/0100854 A1* | 4/2014 | Chen .................. H04L 12/282 704/275 |
| 2014/0156281 A1* | 6/2014 | Boyd .................. H04L 12/281 704/275 |
| 2015/0066479 A1* | 3/2015 | Pasupalak ............ G06F 17/27 704/9 |
| 2015/0228281 A1* | 8/2015 | Raniere ................ G06F 3/167 704/275 |

FOREIGN PATENT DOCUMENTS

| | | |
|---|---|---|
| KR | 10-0556365 B1 | 3/2006 |
| KR | 10-2009-0025939 A | 3/2009 |
| KR | 10-2012-0012919 A | 2/2012 |
| KR | 10-2012-0079344 A | 7/2012 |
| KR | 10-2012-0112325 A | 10/2012 |
| KR | 10-2013-0016024 A | 2/2013 |
| KR | 10-2013-0101505 A | 9/2013 |

* cited by examiner

VOICE COMMAND RECOGNITION APPARATUS AND METHOD

CROSS-REFERENCE TO RELATED APPLICATION(S)

This application claims priority under 35 U.S.C. § 119(a) of Korean Patent Application No. 10-2014-0060559, filed on May 20, 2014, in the Korean Intellectual Property Office, the entire disclosure of which is incorporated herein by reference for all purposes.

BACKGROUND

1. Field

The following description relates to a voice command recognition technology, and more particularly to a voice command recognition technology that enables recognizing a voice command for controlling a device.

2. Description of Related Art

With development of voice recognition technologies, devices having a voice command recognition function that enables controlling functions of a device through a user's voice command have developed. In conventional devices, the voice command recognition function remains inactivated in a usual state, that is, a waiting state. In the waiting state, the voice command recognition function becomes activated when a user presses a specific button installed in a device or says a specific phrase. For example, through a triggering procedure in which a user shouts, "OK, glass!" or presses a designated button and says, "Hi, galaxy", an inactivated voice command recognition function of smart glasses or a smart phone, respectively, is activated.

However, a specific triggering procedure needs to be performed whenever a user wants to control an apparatus using a voice command, incurring huge inconvenience. In addition, the voice command recognition function needs to be activated to recognize a trigger command. The voice command recognition function makes resource allocation, required to control an apparatus, inefficient. Further, when the voice command recognition function is in a waiting state, an additional user's command, such as touching a screen or pressing a button, needs to be input to activate the voice command recognition function in order to recognize a trigger command.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided an a voice command recognition apparatus, including audio sensors placed at different locations; a context determiner configured to determine user context based on a voice received at the audio sensors, wherein the context comprises a vocalization from a user; and a command recognizer configured to activate to recognize a voice command or remain inactive according to the recognized context.

The context determiner may be further configured to comprise a distance calculator configured to calculate a distance from the user based on a time the voice reaches the audio sensors. The command recognizer may be further configured to activate to recognize the command from the voice or remain inactive according to the calculated distance.

The context determiner may be further configured to include a user recognizer configured to determine whether the voice is from a pre-stored specific user, and a distance calculator configured to, in response to a determination that the voice is from the specific user, calculate a distance from the user based on an arrival time of the voice to the audio sensors. The command recognizer may be further configured to activate to recognize the voice command or remain inactive according to the calculated distance.

The context determiner may be further configured to include a distance calculator configured to calculate a distance from the user based on a time the voice reaches the audio sensors, and an ambient noise comparator may be configured to compare magnitude of difference between the voice and ambient noise. The command recognizer may be further configured to activate to recognize the command from the voice or remain inactivated according to the difference between the calculated distance and the difference between the voice and the ambient noise.

The context determiner may be further configured to include a distance calculator configured to calculate a distance from the user based on the time the voice reaches the audio sensors, and a movement recognizer configured to recognize a movement of the user. The command recognizer may be further configured to activate to recognize the command from the voice or remain inactive according to the calculated distance and the recognized movement.

The voice command recognition apparatus may also include an event detector configured to detect an event, wherein the context determiner may be further configured to comprise a distance calculator configured to calculate a distance from the user based on the time the voice reaches the respective audio sensors, and a operation recognizer configured to recognize an operation of a device based on the event detected by the event detector. The command recognizer may be further configured to activate to recognize the command from the voice or remain inactive to the calculated distance and the recognized operation.

The voice command recognition apparatus may also include a motion sensor configured to detect movement; and an event detector configured to detect an event, wherein the context determiner may be further configured to comprise a distance calculator configured to calculate a distance from the user based on the time the voice reaches the audio sensors, an action recognizer configured to recognize an action from the user based on the detected movement, and an operation recognizer configured to recognize an operation of the device based on the detected event, wherein the command recognizer may be further configured to the recognized action, and the recognized action, activate to recognize the command from the voice or remain inactive according to the calculated distance.

In accordance with an embodiment, there is provided a voice command recognition method, including receiving a voice at audio sensors placed at different locations of a device; determining user context based on the voice, wherein the context comprises vocalization from a user; and activating the device to recognize a command from the voice or remaining inactive based on the user context.

The determining of context may include determining a distance from the user based on the time the voice reaches the audio sensors, wherein the activating or the remaining inactive may be based on the calculated distance.

The determining of context may include determining whether the voice is from a specific user pre-registered, and, in response to a determination that the voice is from the specific user, calculating a distance from the user based on the time the voice reaches the audio sensors. The activating or the remaining inactive may be based on the calculated distance.

The determining of context may include calculating a distance from the user based on the time a voice reaches the audio sensors, and comparing magnitude of a difference between the voice and ambient noise, wherein the activating or the remaining inactive may be based on the calculated distance and the difference between the voice and the ambient noise.

The determining of context may include calculating a distance from the user based on the time the voice reaches the audio sensors, and recognizing an action from the user based on movement detected by a motion sensor, wherein the activating or the remaining inactive may be based on the calculated distance and the recognized action.

The determining of context may include determining a distance from the user based on the time the voice reaches the audio sensors, and recognizing an operation of the device based on an event detected by an event detector, wherein the activating or the remaining inactive may be based on the calculated distance and the recognized operation.

The determining of context may include calculating a distance from the user based on the time the voice reaches the audio sensors, recognizing an action from the user based on movement detected by a motion sensor, and recognizing an operation of the device based on an event detected by an event detector, wherein the activating or the remaining inactive may be based on the calculated distance, the recognized action, and the recognized operation.

In accordance with an embodiment, there is provided a computer program embodied on a non-transitory computer readable medium, the computer program being configured to control a processor to perform the method described above.

In accordance with another embodiment, there is provided a voice command recognizing apparatus, including audio sensors placed at different locations of a device; a distance calculator configured to calculate a distance from a user based on arrival time of a voice relative to each audio sensor, or a time difference in arrival times relative to all the audio sensors; and a command recognizer configured to activate in response to the calculated distance being within a distance threshold and recognize a voice command from the received voice to control the device.

In response to subsequent vocal sounds being absent after a predetermined period of time, the command recognizer may be automatically inactivated to a waiting state.

The voice command recognition apparatus may include a user recognizer configured to compare the received voice with a pre-stored voice to determine whether the received voice is from an authorized user, wherein in response to determining that the received voice is from the authorized user, the distance calculator switches from an inactive state to an active state.

The voice command recognition apparatus may include an ambient noise comparator 86 configured to extract a signal-to-noise ratio (SNR) from ambient noise and compare a magnitude of the received voice with a magnitude of the ambient noise received along with the received voice.

In response to the SNR being greater than a threshold and the calculated distance being within the distance threshold, the command recognizer may be activated.

Other features and aspects may be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which.

Figure 1:
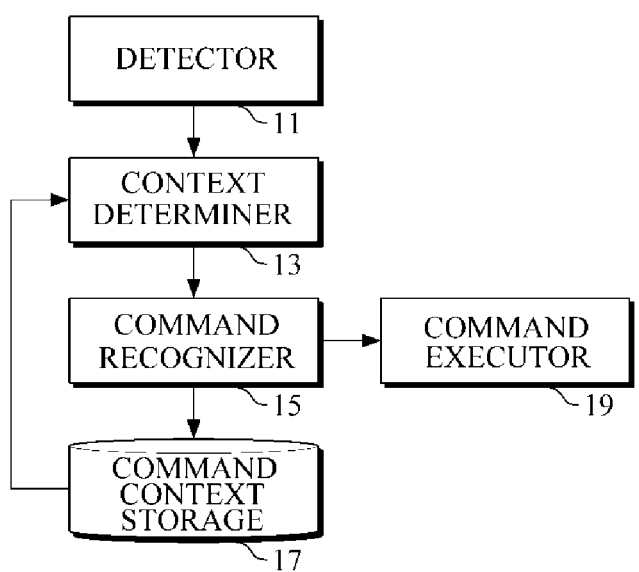
FIG. 1 is a block diagram illustrating an example of a voice command recognition apparatus, in accordance with an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

It will be understood that, although the terms first, second, third, etc. may be used herein to describe various embodiments, elements, components, regions, layers and/or sections, these embodiments, elements, components, regions, layers and/or sections should not be limited by these terms. These terms are only used to distinguish one embodiment, element, component, region, layer or section from another region, layer or section. These terms do not necessarily imply a specific order or arrangement of the embodiments, elements, components, regions, layers and/or sections. Thus, a first embodiment, element, component, region, layer or section discussed below could be termed a second element, component, region, layer or section without departing from the teachings description of the present description.

In accordance with an illustrative example, voice command recognition of a computing device requires structural resources, such as a processor and a memory, to analyze a received voice signal and comparing such voice signal with pre-stored command data. The resources are usually shared between a voice command recognition process and other processes for different functions. Thus, prior to activating a voice command recognition process, the voice command recognition process determines whether a user intends to allocate a resource occupied by a different process or a resource in a waiting state.

One method to determine whether a user intends to input a voice command uses a trigger command that initiates a voice command recognition function. Upon the trigger command being input, an apparatus performs a processing of recognizing a voice command of a voice signal, and controls other functions thereof according to the recognized voice command.

In this case, the trigger command is input by physically pressing a soft or hardwired button installed in the apparatus and simultaneously or subsequently stating one or more predetermined phrases. For example, referring to FIG. 14, there is provided an example of a configuration of a voice command recognition system 140 that uses a trigger command by saying out loud one or more predetermined phrases.

Figure 14:
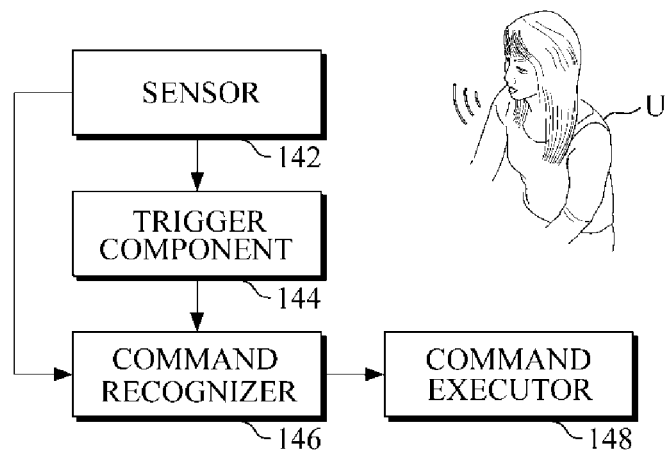
FIG. 14 is a diagram illustrating a configuration of a voice command recognition system, in accordance with an embodiment.

As shown in FIG. 14, the convention voice command recognition system 100 includes a sensor 143, a trigger component 144, a command recognizer 146, and a command executor 148. The sensor 142 is a microphone that receives a voice signal from a user U or various acoustics occurring in surroundings thereof.

The voice signal received by the sensor 142 is not always considered a voice command for controlling a device. In FIG. 14, one or more predetermined phrases are used as a triggering means that activates a process of recognizing a voice command. For example, if a voice signal, such as "OK, glass" or "Hi, galaxy" is received, the device may activate a voice command recognition function, and then a process of recognizing a voice command is performed with respect to the voice signal received at the sensor 142.

The trigger component 144 determines whether to activate the command recognizer 146, by determining whether the voice signal received by the sensor 142 includes any phrases (e.g., "OK, glass" and "Hi, galaxy") that are used to activate a process of recognizing a voice command.

Once the command recognizer 146 is activated by the trigger component 144, any following voice signals received by the sensor 142 may be processed by the command recognizer 146. The command recognizer 146 determines whether the received voice signal is a command for controlling a device. If a specific command is recognized, the command executor 148 executes the recognized command to control a desired function.

Accordingly, a user is able to trigger a voice command recognition function by saying out loud a predetermined phrase. However, the triggering method requires a user to say a specific phrase triggering a voice command recognition function whenever the user wants to control an apparatus using a voice command. As a result of this configuration, the user is significantly inconvenienced. In addition, in order to recognize a trigger command, a voice command recognition function of the device always needs to be activated, requiring a significant amount of power consumption. Thus, this configuration is disadvantageous, considering the fact that a mobile terminal or a wearable device, such as smart glasses, smart watches, and smart phones, consume the least amount of power possible in a waiting state. Further, even when a voice command recognition function remains in a waiting state, the voice command recognition function needs to be activated. Thus, an additional user command, such as touching a screen or pressing a button, needs to be input to use a trigger command.

Usually, mobile or wearable computing devices, such as smart glasses, smart watches, and smart phones, include an audio sensor or a microphone to receive a voice signal. As the device is compact, a user brings the device close to a mouth to speak. Thus, with respect to the mobile or wearable computing device, whether a user intends to input a voice command is determined based on user context, such as a distance from a user and the device, intensity of a voice signal of the user, and the device's motion.

In this regard, the following embodiments provide a voice command recognition technique that automatically, without user intervention, activates a voice command recognition function based on user context in a voice signal received by a voice command recognition apparatus in a device, without performing a triggering procedure. The device may include, but is not limited to, a mobile telecommunication device or a tablet. To this end, in the embodiments, the user context is determined based on information extracted from the received voice signal. Then, based on the determined user context, whether the received voice signal is from the user with intention of using a voice command is determined. If a certain voice signal is determined, based on user context, as a voice command "made by the user with intention of using a voice command", a voice command recognition process is activated. A resultant recognized command may be automatically processed to perform a control operation intended by the command. Alternatively, if a certain voice is determined, based on user context, as a voice command "made by the user without intention of using a voice command," the voice command recognition process does not become activated.

In one example, the user context refers to information processed and analyzed by an apparatus in order to determine user's intention of using a voice command with respect to the currently received voice. The user context is determined based on information extracted from the received voice signal and/or information that is detected at the same time as when the voice signal is received. For example, information determining user context is a distance calculated from a received voice signal between a mouth of a user and a voice command recognition apparatus (that is, a user-apparatus distance), information as to whether the received voice signal is from a predetermined, specific user, a difference between the voice signal and ambient noise, an application executed by an apparatus, or movement of the apparatus.

For example, a user-apparatus distance is calculated from a received voice. Then, user context is determined based on the calculated distance. Generally, the greater a distance between a user and an apparatus, the accuracy in voice recognition is drastically reduced. Thus, to input voice, the user's mouth needs to be in a close proximity to the apparatus. Thus, in the embodiments, a distance between a user and an apparatus is calculated based on a received voice signal. Then, whether the user is in sufficient close proximity for the apparatus to be able to receive a voice command is determined based on the calculated distance, and accordingly, the user's intention is determined.

In the embodiments, a user-apparatus distance is calculated based on time of receipt of vocal sounds coming from a user's mouth toward audio sensors (ASs) embedded in the voice command recognition apparatus. The distance calculating technique based on time of receipt of vocal sounds is implemented by a location tracking technique that uses Time of Arrival (TOA) or Time Difference of Arrival (TDOA) that are well known in the related technical field.

The audio sensors are acoustic sensors that are manufactured under micro electro mechanical system (MEMS). The audio sensors may be Ultra-Lower-Power (ULP) sensors, each designed to reduce power consumption. The audio sensors are fixed at different locations in the apparatus. In one example, the voice command recognition apparatus and the audio sensors are provided as much as required for calculating a user-apparatus distance using TOA or TDOA. Hereinafter, a voice command recognition apparatus including four audio sensors (ASs) is described, but embodiments of the present description are not limited thereto. The number of audio sensors may be configured to enable calculating a distance between a user, for example, the user's mouth, and a voice command recognition apparatus, such as, the center of the apparatus.

If a distance between the user and the apparatus is calculated, the user intention of using a voice command is determined based on the calculated distance. For example, if the calculated distance is smaller than a predetermined threshold, a received voice is determined as a voice command "made by the user with intention of using a voice command." In another example, if the calculated distance is greater than a predetermined threshold, a received voice is not determined as a voice command "made by the user with intention of using a voice command."

In one illustrative example, the threshold is defined based on empirical or abstract/theoretical distance-voice recognition accuracy. For example, if voice recognition accuracy relative to the voice command recognition apparatus is greater than 90% when a distance between a user's mouth and the device is 50 cm, the threshold is determined as 50 cm.

In another embodiment, in addition to a user-apparatus distance calculated from a received voice, whether a received voice coincides with voice of a specific user is further determined. In this embodiment, prior to, simultaneously, or after a point in time when the user-apparatus distance is calculated from the received voice, whether the received voice corresponds to the voice of a predefined specific user is determined. The determination is made by comparing the currently received voice with voice data previously registered and stored by the specific user.

A distance between the specific user and the voice command recognition apparatus is calculated using TOA of the voice that is received from the specific user's mouth to a plurality of audio sensors operatively connected to the voice command recognition apparatus of the device. If a determination is made that the received voice corresponds to the voice of the predefined specific user, user context is determined based on the calculated distance that the specific user is speaking in proximity to the device. Based on the determined user context, the voice command recognition apparatus determines that the specific user is speaking with intention of using a voice command.

In still another embodiment, in addition to a user-apparatus distance, the voice command recognition apparatus also determines whether volume, magnitude, or intensity of a received voice is greater than a predetermined threshold compared to that of ambient noise. In this embodiment, prior to, simultaneously at, or after a point in time of when the user-apparatus distance is calculated, ambient noise included in the received voice signal is identified. Then, volume, magnitude, or intensity of the voice signal is compared with that of the ambient noise. If the voice signal is not greater than the ambient noise, or if a difference between magnitude of the voice signal and a predetermined threshold is smaller than a difference between magnitude of the noise and the predetermined threshold, the voice command recognition apparatus determines that the user is not speaking toward the device.

Alternatively, if the voice signal is greater than the ambient noise, or if a difference between magnitude of the voice signal and a predetermined threshold is greater than a difference between magnitude of the noise and the predetermined threshold, the voice command recognition apparatus determines that the user is speaking toward the device. Then, the user-apparatus distance is calculated using TOA of the voice that is received from the user's mouth to a plurality of audio sensors. If a received voice is louder than a predetermined threshold compared to ambient noise, based on the calculated distance, the voice command recognition apparatus determines user context indicating that the specific user is speaking toward the device. Then, based on the determined user context, the voice command recognition apparatus determines that the specific user is intending to use a voice command.

In yet another embodiment, in addition to a user-apparatus distance, operation information and/or movement information is further detected. In this embodiment, by checking application log data of the voice command recognition apparatus, a type of the currently implemented application is identified. Further, the apparatus' movement is detected based on data detected by an accelerometer, a gyroscope, a Global Positioning System (GPS) sensor, or the like, which is embedded in the apparatus. According to the operation or movement of the apparatus, a user status of the apparatus is determined. Based on user context which includes the user-apparatus distance and operation/movement of the apparatus, the voice command recognition apparatus determines whether the user intends to use a voice command.

Hereinafter, examples of a voice command recognition apparatus and a voice command recognition method are described with reference to drawings.

In accordance with an illustrative example, descriptions of FIGS. 1 through 13 are provided to explain various configurations or embodiments of a voice command recognition apparatus and method thereof. It is obvious for those skilled in the art that different apparatuses and methods with various combinations are possible within the scope of the claims that follow. Components of a voice command recognition apparatus are implemented using hardware including circuits each configured to execute a specific function.

FIG. 1 is a block diagram illustrating an example of a voice command recognition apparatus. In this example, the voice command recognition apparatus activates the voice command recognition function by determining a user's context based on a received voice and determines the user's intention on whether to issue a voice command based on the determined context. As shown in FIG. 1, a voice command recognition apparatus 100 includes structural components, such as a detector 11, a context determiner 13, a command recognizer 15, a command executer 19, and a command context storage 17.

The detector 11 includes a plurality of audio sensors. The audio sensors are placed at predetermined locations within a device including the voice command recognition apparatus, and are synchronized in time by a controller of the device. The audio sensors may also receive noises surrounding the device even when a voice command recognition function is inactive, that is, even during a waiting state. To reduce power consumption, an ultra lower power (ULP) audio sensor may be used. An acoustic signal received at the audio sensors is subject to basic determinations as to whether magnitude of the acoustic signal is greater than a predetermined reference level or whether the acoustic signal has a pattern similar to human voice. If the acoustic signal is determined as a human voice signal with magnitude greater than the predetermined reference level, a distance between a speaker and the device is calculated based on the time the acoustic signal is reached relative to the audio sensors.

In another example, the detector 11 includes a motion sensor that detects movement of a device. The motion sensor detects a location, speed, rotational direction, inclination, or the like, of the device including the sensors, such as a global positioning system (GPS) sensor, an accelerometer, or a gyroscope. Movement of the device gives an indication of whether a user is walking, running, riding on a vehicle, holding the device with a hand, wearing the device on a bent hand, or the like. A device's movement is detected by a motion sensor when voice is received.

In another example, the detector 11 is an event detector that detects an operational state of a device. The event detector detects various operations of a device, for example, a type of an application executed by the device, whether the device is used for a phone call, or whether the device is used for data communication. A device's operation is detected by the detector 11 when voice is received.

The context determiner 13 determines a user context based on at least one of a user-apparatus distance, a device's movement, and the device's operation. For example, a user context includes situations, such as, a user is speaking with a device held by hand close to the user's mouth, or a different speaker, rather than the user, is speaking in surroundings of a device. Another example of the user context includes a user is driving a car, or a user is wearing a device on a wrist and speaking toward the device by raising the arm close to the mouth. Once the user context is determined, the user intention is determined based on the user context. That is, whether the user is intending to input a voice command to control the device is determined based on the user context. If the user intends to control the device, the context determiner 13 activates the command recognizer 15. Alternatively, if the user does not intend to control the device by delivering a voice command, the context determiner 13 keeps the command recognizer 15 to remain in a waiting state.

If activated by the context determiner 13, the command recognizer 15 proceeds to execute a process of recognizing a voice command of the received voice. Herein, the 'currently received voice' refers to voice that the context determiner 13 currently receives and determines to be a voice indicative that a user is intending to input a command. Then, if subsequent vocal sounds do not follow in a predetermined time, the command recognizer 15 automatically becomes inactive and remains in a waiting state until activation is performed by the context determiner 13. The command executer 19 controls functions of the device in accordance with a voice command recognized by the command recognizer 15.

User context information associated with a voice command recognized by the command recognizer 15 is cumulatively stored in the command context storage 17. The accumulated information is used as ancillary information when the context determiner 13 determines user context and user intention of a subsequent voice signal.

Figure 2:
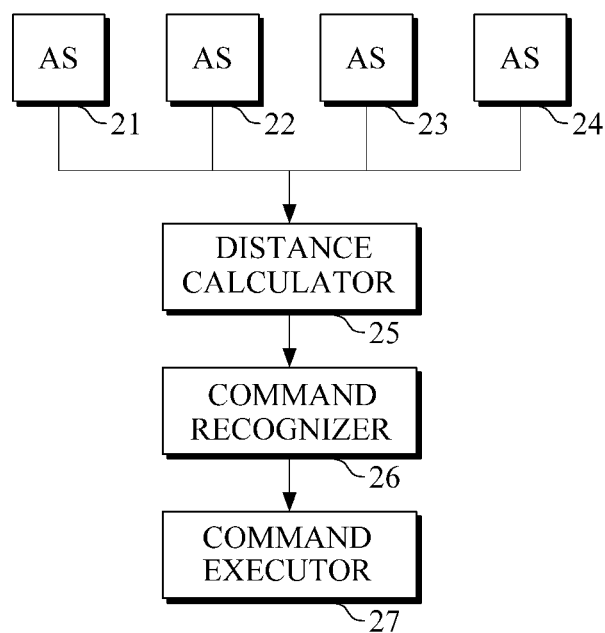
FIG. 2 is a block diagram illustrating an example of a voice command recognition apparatus, in accordance with another embodiment.

FIG. 2 is a block diagram illustrating an example of a voice command recognizing apparatus, in accordance with an embodiment. In this example, the voice command recognition apparatus activates a voice command recognition function by determining a user's intention based on a user-apparatus distance. In FIG. 2, a voice command recognizing apparatus 20 includes components, such as audio sensors (ASs) 21, 22, 23, and 24, a distance calculator 25, a command recognizer 26, and a command executor 27.

The audio sensors (ASs) 21, 22, 23, and 24 are placed at different predetermined locations of the apparatus or device including the voice command recognizing apparatus and synchronized in time with other components of the voice command recognition apparatus 20. The audio sensors may be ULP audio sensors capable of receiving voice in a waiting mode.

The distance calculator 25 calculates a distance between a user and the voice command recognition apparatus 20 based on arrival time of a received voice relative to each audio sensor, ASs 21, 22, 23, and 24, or time difference in arrival times of the received voice relative to all the audio sensors. Then, based on the calculated user-apparatus distance being within a predetermined distance threshold, a state/context in which a user is vocalizing relative to the voice command recognition apparatus 20 is determined. The predetermined distance threshold is a threshold predefined indicative that the user is close to the voice command recognizing apparatus 20 indicative of an intent to submit a command to the voice command recognition apparatus 20. If a user's state is determined, the user's intention is determined based on the determined user's state. That is, the distance calculator 25 calculates the distance to determine whether the user intends to input a voice command to control the voice command recognition apparatus 20. If the user intends to do so, the distance calculator 25 activates the command recognizer 26.

If activated by the distance calculator 25, the command recognizer 26 initiates a process of recognizing a voice command of the currently received voice. If subsequent vocal sounds do not follow within a predetermined period of time, the command recognizer 26 is automatically inactivated and remains in a waiting state until activation is performed by the distance calculator 25. The command executor 27 controls functions of the voice command recognition apparatus 20 in accordance with the voice command recognized by the command recognizer 26.

In this example, in a waiting state, only the audio sensors 21, 22, 23, and 24 are activated, while other components remain inactivated. If a recognizable human voice is received by one or more of the audio sensors 21, 22, 23, and 24, the distance calculator 25 is automatically activated to calculate a user-apparatus distance. Then, only when the calculated user-apparatus distance is smaller than a predetermined threshold, the command recognizer 26 is activated. Accordingly, there is provided an apparatus that directly recognizes a voice command without using an additional trigger command.

Figure 3:
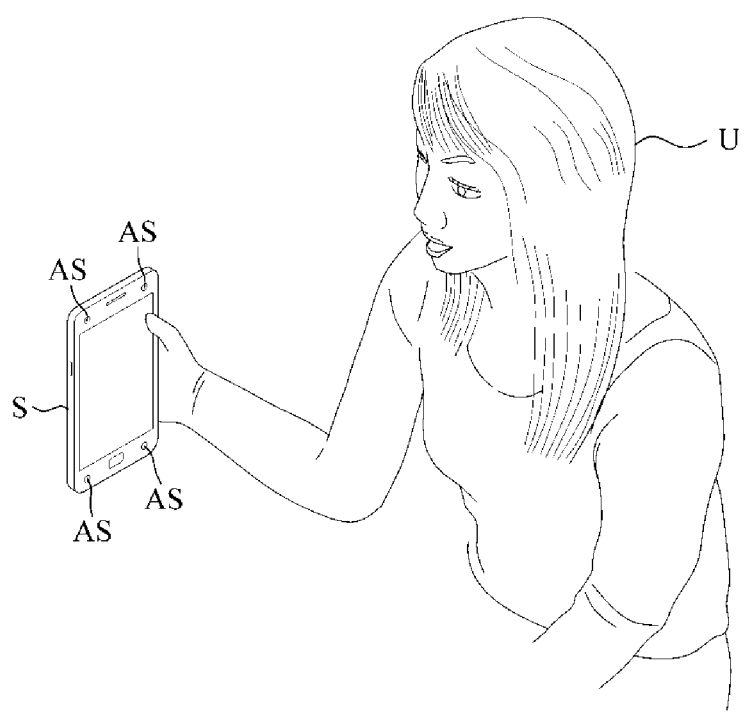
FIG. 3 is a diagram illustrating an embodiment of the voice command recognition apparatus shown in FIG. 2, in accordance with an embodiment.

FIG. 3 is a diagram illustrating an embodiment of the voice command recognizing apparatus shown in FIG. 2, in accordance with an embodiment. In FIG. 3, a user U holds a mobile terminal with a hand and brings the mobile terminal S close to a mouth to input a voice command without an additional trigger command. In this example, the audio sensors (ASs) are placed at locations near the edge of a display D in the mobile terminal S. However, the above is merely exemplary, and the number and locations of the audio sensors may vary with various combinations. The mobile terminal S estimates a distance between a mouth of the user U and a center of the mobile terminal S, that is, a user-apparatus distance, by processing a voice signal received by the audio sensors using a location-tracking technology based on arrival time. If the estimated user-apparatus distance is smaller than a predetermined reference distance, the mobile terminal S determines that the user U intends to input a voice command. According to such a determination, the mobile terminal S automatically activates a voice command recognizing process without an additional trigger command to recognize a voice command of the voice recognized by the audio sensors. As a result, the mobile terminal S directly recognizes and executes the voice command input by the user U without an additional trigger command.

Figure 4:
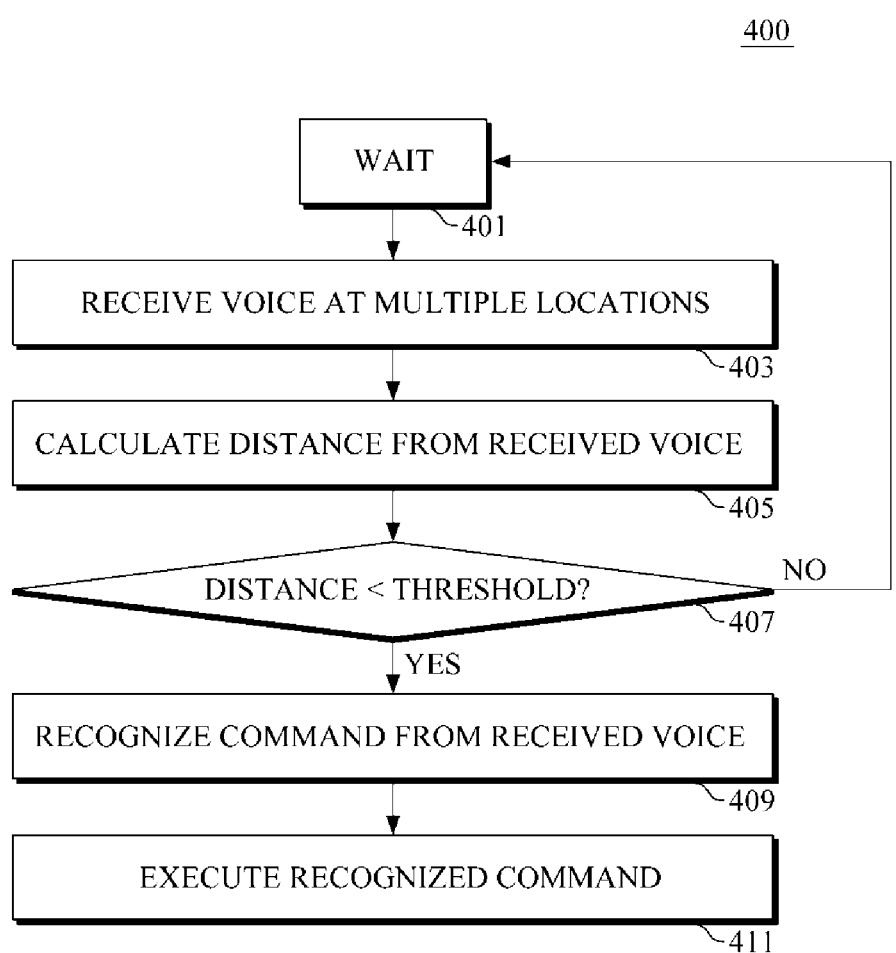
FIG. 4 is a flowchart illustrating an example of a voice command recognition method, in accordance with an embodiment.

FIG. 4 is a flowchart illustrating an example of a voice command recognizing method, in accordance with an embodiment. In FIG. 4, the voice command recognizing method enables determination of a user's intention based on a user-apparatus distance.

In FIG. 4, a voice command recognizing method 400 starts out by executing a standby operation 401 in which a voice command recognizing process remains inactive. In the standby operation 401, a plurality of voice receiving sensors remain in a state ready to receive a voice. As a plurality of voice receiving sensors needs to remain in an operational state, ULP sensors requiring lower power consumption may be used.

If a user speaks, in operation 403, the user's voice is received almost simultaneously by the sensors fixed at different predetermined locations. In another example, the sensors placed at different locations of a device, the user's voice is received by the sensors at slightly different times. In operation 405, a distance between a location of a voice source (e.g., a location of a mouth of the user) and a center of gravity of the sensors (e.g., a center location of the device) is estimated or calculated based on the slightly different times.

At operation 407, a determination is made of whether the calculated or estimated distance is smaller than a predetermined threshold. In voice recognition technologies, a distance between a user and a device generally determines voice recognition accuracy. A distance relative to a particular device, which guarantees accuracy of recognizing a voice command, is predetermined as a threshold.

If the user-apparatus distance is smaller than the predetermined threshold ("Yes" in operation 407), a determination is made that the user intends to input a voice command. Then, in operation 409, a process of recognizing a command from the currently received voice is activated. Then, in operation 411, the recognized command is executed. Alternatively, if the user-apparatus distance is greater than the predetermined threshold ("No" in operation 407), a determination is made that the user does not intend to input a voice command, and the process returns to the waiting state at operation 401 to receive the next voice.

Figure 5:
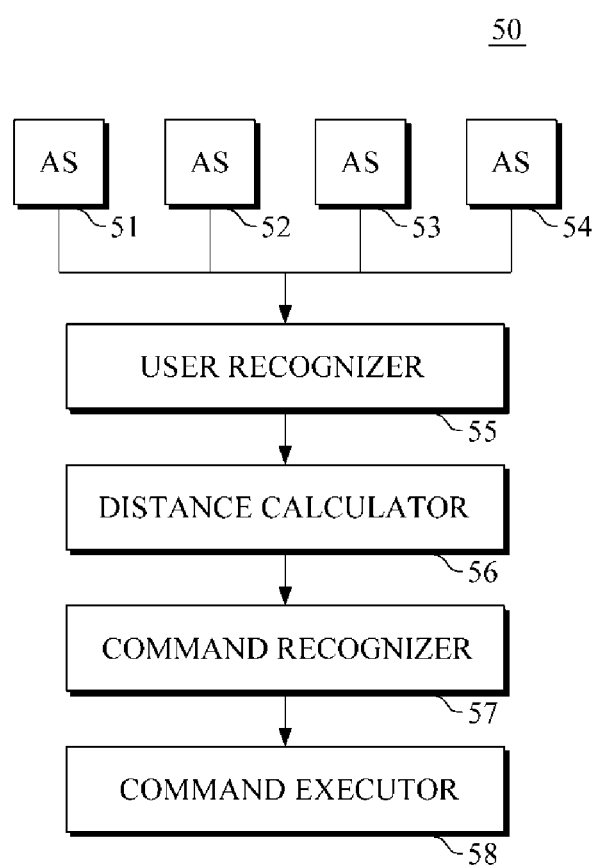
FIG. 5 is a block diagram illustrating another example of a voice command recognition apparatus, in accordance with an embodiment.

FIG. 5 is a block diagram illustrating another example of a voice command recognizing apparatus, in accordance with an embodiment. In FIG. 5, the voice command recognition apparatus activates a voice command recognition function by determining a user's intention based on a user-apparatus distance. A voice command recognizing apparatus 50 includes structural components, such as audio sensors (ASs) 51, 52, 52, and 54, a user recognizer 55, a distance calculator 56, a command recognizer 57, and a command executor 58. The voice command recognition apparatus 50 includes structural components similar to those of the voice command recognition apparatus 20 shown in FIG. 2, except for the user recognizer 55.

The user recognizer 55 is a structural component that determines whether a voice received by the audio sensors 51, 52, 53, and 54 is a voice from a specific user or an authorized user to use the voice command recognizing apparatus. The specific user registers a voice thereof in the voice command recognizing apparatus 50 in order to prevent a third party from controlling the voice command recognition apparatus 50. In this case, the user recognizer 55 includes voice data pre-stored by the specific user. The user recognizer 55 compares the received voice with pre-stored voice data to determine whether the received voice is from the specific user.

If the voice received by the voice sensors 51, 52, 53, and 54 is determined as voice from the specific user, the distance calculator 56 switches from an inactive state to an active state. Then, the distance calculator 56 calculates a distance, and the command recognizer 57 is activated based on the calculated distance. Then, a command recognized by the command recognizer 57 is executed by the command executor 58.

In this example, in the waiting state, only the audio sensors 51, 52, 53, and 54 are activated, while other components remain inactivated. If a recognizable human voice is received by the audio sensors 51, 52, 53, and 54, the user recognizer 55 is automatically activated to determine whether the received human voice coincides with a specific user's voice that is pre-stored. Then, only when the calculated distance is smaller than a predetermined threshold, the command recognizer 57 is activated. Accordingly, there is provided an apparatus that directly recognizes a voice command of a specific user in a waiting state without using an additional trigger command.

Figure 6:
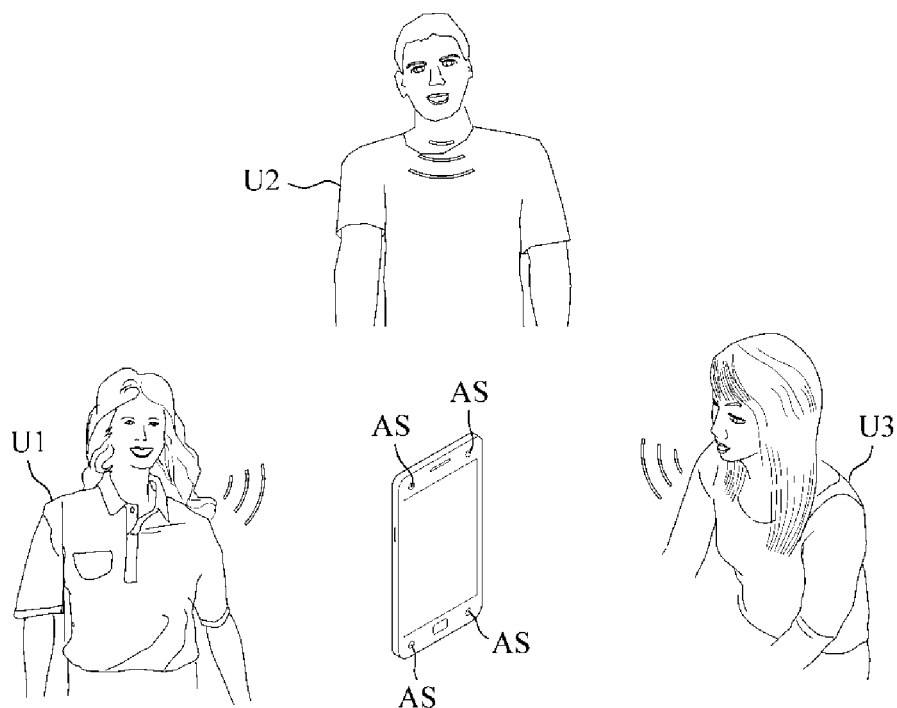
FIG. 6 is a diagram illustrating an embodiment of the voice command recognition apparatus shown in FIG. 6, in accordance with an embodiment.

FIG. 6 is a diagram illustrating an embodiment of the voice command recognizing apparatus shown in FIG. 5, in accordance with an embodiment. In FIG. 6, multiple users U1, U2, and U3 are conducting a conversation in close proximity to a mobile terminal S. One user U1 makes a voice command toward the mobile terminal S without an additional trigger command. The mobile terminal S compares a voice received through audio sensors (ASs) with pre-stored voice data to determine whether the user U1 coincides with a pre-registered user. If the user U1 is determined to be a pre-registered user, the mobile terminal S activates a voice command recognizing process by estimating a user-apparatus distance based on the time the received voice reaches the audio sensors. As such, even when multiple users speak in close proximity to the mobile terminal S, the mobile terminal S is able to directly recognize and execute only a voice command of a pre-designated user without an additional trigger command.

Figure 7:
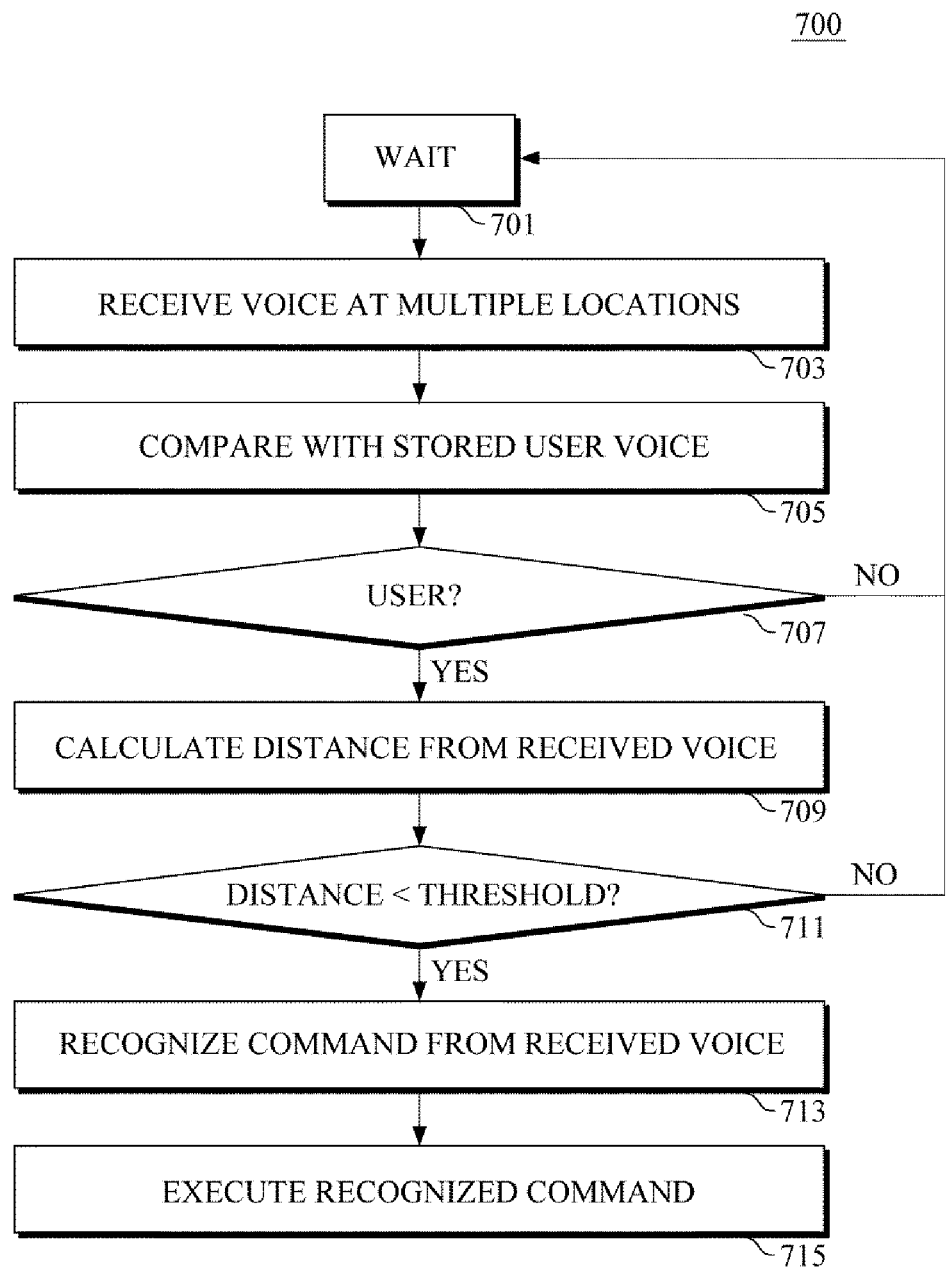
FIG. 7 is a flowchart illustrating another example of a voice command recognition method, in accordance with an embodiment.

FIG. 7 is a flowchart illustrating another example of a voice command recognizing method. In FIG. 7, the voice command recognizing method enables determining a pre-registered specific user's intention based on a user-apparatus distance. In FIG. 7, a voice command recognizing method 700 starts out at a waiting state 701 in which a voice-command recognizing process is inactive.

If a user speaks, the user's voice is received almost simultaneously by a plurality of sensors fixed at different locations. In another example, as the sensors are placed at different locations, the user's voice is received by the sensors at slightly different times. In operation 705, the received voice is compared with pre-stored voice data of a user who has been registered. If the received voice is a voice from the registered user ("Yes" in operation 707), in operation 709, a user-apparatus distance is calculated from the received voice. If the received voice is not a voice from the registered user ("NO" in operation 707), the process returns to the stand mode of operation 701 to wait to receive the subsequent vocal sounds.

In operation 711, a determination is made as to whether the user-apparatus distance calculated or estimated in operation 709 is smaller than a predetermined threshold. If the user-apparatus distance is smaller than the predetermined threshold ("Yes" in operation 711), a determination that the user intends to input a voice command is made. Accordingly, at operation 713, a process of recognizing a command from the currently received voice is activated. Then, at operation 715, the recognized command is executed. Alternatively, if the user-apparatus distance is greater than the predetermined threshold ("No" in operation 711), a determination is made that the user does not intend to input a voice command. Accordingly, the process returns to the waiting state of operation 701 to wait to receive the next voice.

Figure 8:
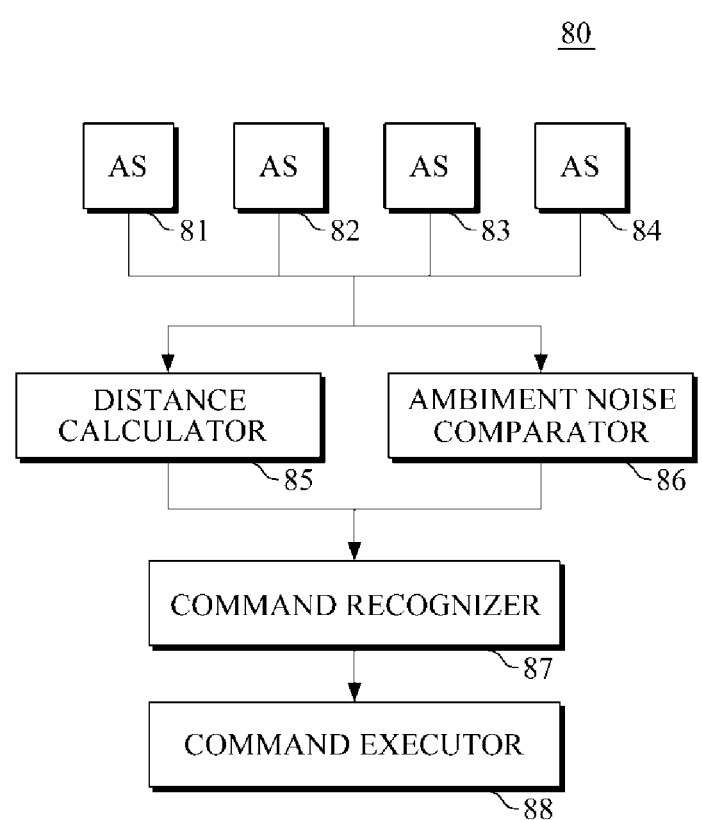
FIG. 8 is a block diagram illustrating another example of a voice command recognition apparatus, in accordance with an embodiment.

FIG. 8 is block diagram illustrating another example of a voice command recognizing apparatus, in accordance with an embodiment. In FIG. 8, the voice command recognition apparatus activates a voice command recognition function by determining a specific user's intention based, not only on a user-apparatus distance, but also on a result of comparison between a received voice and ambient noise. A voice command recognizing apparatus 80 shown in FIG. 8 includes components, such as audio sensors (ASs) 81, 82, 83, and 84, a distance calculator 85, an ambient noise comparator 86, a command recognizer 87, and a command executor 88. The voice command recognition apparatus 80 includes components similar to those of the voice command recognition apparatus 20 shown in FIG. 2, except for the ambient noise comparator 86.

For example, a user inputs a voice command to the voice command recognition apparatus 80 to output specific information. The user may be driving a car with the voice command recognition apparatus 80 placed in close proximity to the user or the user may be doing work using a desktop in the office with the voice command recognition apparatus 80 placed in close proximity to the user. In this case, the voice command recognition apparatus 80 determines that the received voice is a voice command by determining a user-apparatus distance and determining a direction of the voice command; that is, determining that the user is speaking toward the voice command recognition apparatus 80. In FIG. 8, the distance calculator 85 calculates a user-apparatus distance from a voice received by the audio sensors 81, 82, 83, and 84, while the ambient noise comparator 86 determines that the received voice is coming in a direction from the user toward the voice command recognition apparatus 80. For example, the ambient noise comparator 86 compares a magnitude of the received voice with a magnitude of ambient noise received along with the voice. To this end, the ambient noise comparator 86 extracts a signal-to-noise ratio (SNR) from the received noise.

If an SNR of the voice received by the audio sensors 81, 82, 83, and 84 is louder than a predetermined threshold (that is, the voice is louder than surrounding noise) and a user-apparatus distance is smaller than a predetermined threshold (that is, the user is in close proximity to the device), the command recognizer 87 is activated. Then, a command recognized by the command recognizer 87 is executed by the command executor 88.

In this example, in a waiting state, only the audio sensors 81, 82, 83, and 84 are activated, while other components remain inactivated. If a recognizable human voice is received by the audio sensors 81, 82, 83, and 84, either the distance calculator 85 or the ambient noise comparator 86 is activated to compare the user-apparatus distance or the SNR calculated from the received human voice with a predetermined reference value. Then, only when the user-apparatus distance is short enough and the SNR is large enough, the command recognizer 87 is activated. Accordingly, there is provided an apparatus that directly recognizes a specific user's voice command in a waiting state without an additional trigger command.

Figure 9:
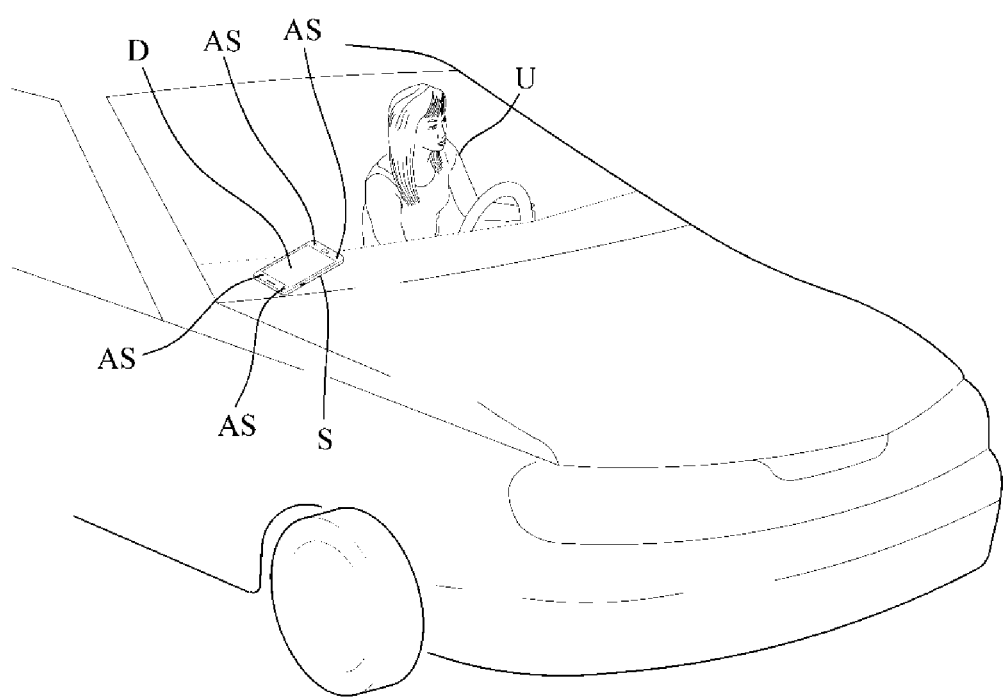
FIG. 9 is a diagram illustrating an embodiment of the voice command recognition apparatus shown in FIG. 8, in accordance with an embodiment.

FIG. 9 is a diagram illustrating an embodiment of the voice command recognition apparatus 80 shown in FIG. 8, in accordance with an embodiment. In FIG. 8, a user U is driving with a mobile terminal S placed in close proximity. For example, the user U may be looking for a restaurant. In this case, the user produces a voice command toward the mobile terminal S to search for restaurants in surroundings, without an additional trigger command. The mobile terminal S calculates a user-apparatus distance and extracts an SNR from a voice received at audio sensors (ASs). Based on the determined user-apparatus distance and the SNR, the mobile terminal S determines that the user U who is speaking intends to input a voice command, and activates a voice command recognizing process. As such, by determining that the user U is speaking toward the mobile terminal S in close proximity, the mobile terminal S is able to directly recognize and execute a command from the voice without an additional trigger command.

Figure 10:
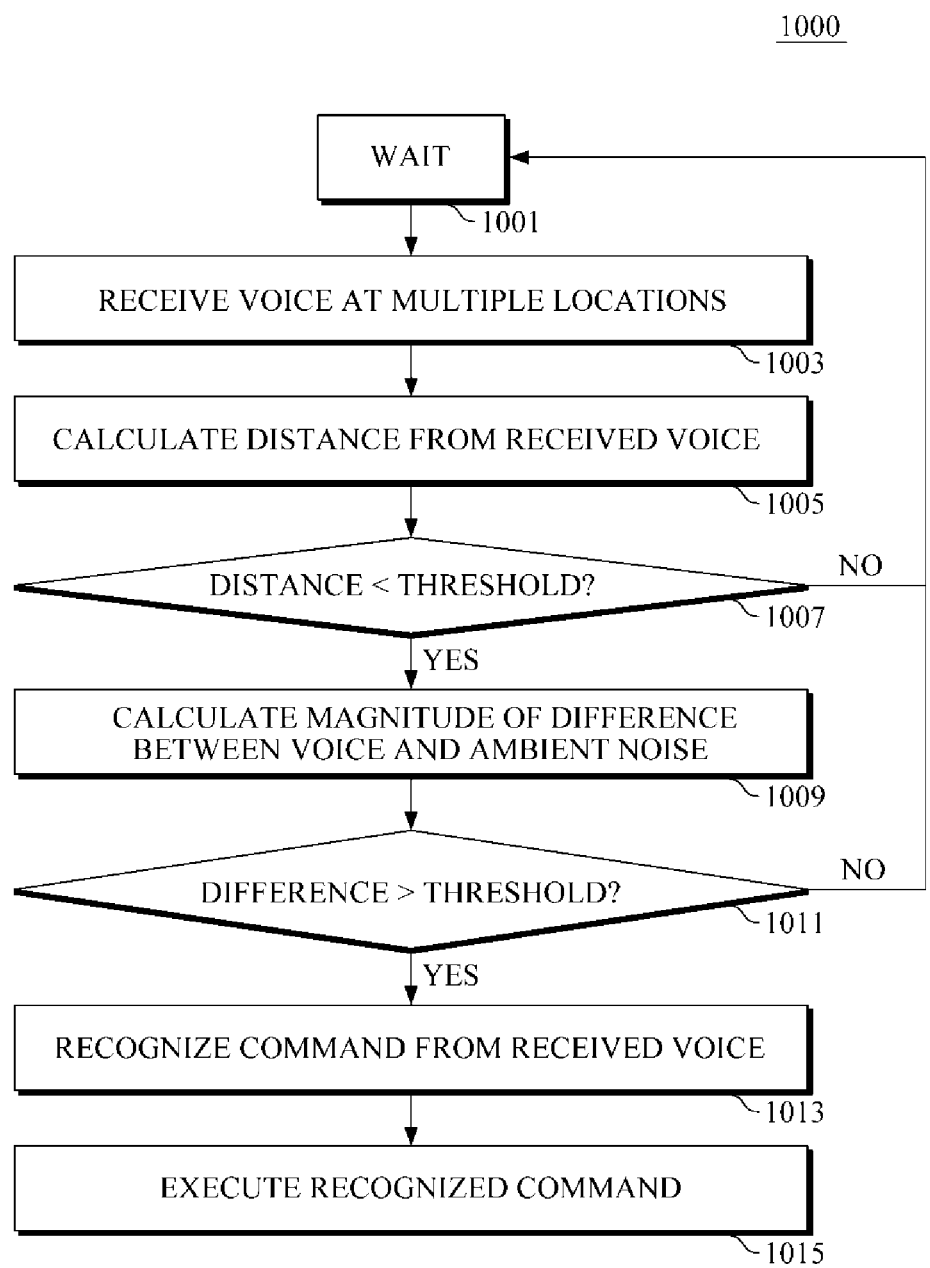
FIG. 10 is a flowchart illustrating another example of a voice command recognition method, in accordance with an embodiment.

FIG. 10 is a flowchart illustrating another example of a voice command recognition method, in accordance with an embodiment. In this example, the method enables a determination of a user's intention based on a user-apparatus distance and difference between a voice and ambient noise. In operation 1001, a voice command recognition method starts out in a waiting state in which a process of recognizing a voice command is inactive. In the waiting state of operation 1001, a plurality of voice receiving sensors remain in a state ready to receive a voice signal.

If the user speaks, at operation 1003, the user's voice is received by the sensors fixed at different locations, in one example, almost simultaneously. In operation 1005, a user-apparatus distance is calculated from the received voice. If the user-apparatus distance is smaller than a predetermined threshold ("Yes" in operation 1007), at operation 1009, a difference between the voice and ambient noise is calculated. Alternatively, if the user-apparatus distance is greater than the predetermined threshold ("No" in operation 1007), the process returns to operation 1001, the waiting state, and waits to receive the next voice signal.

At operation 1011, the method determines whether the difference between the voice and ambient noise (that is, an SNR), which is calculated in operation 1009, is greater than a predetermined threshold. If the SNR is greater than the predetermined threshold ("Yes" in operation 1011), a determination is made that the user intends to input a voice command. Then, at operation 1013, a process of recognizing a command from the currently received voice is activated. Then, at operation 1015, the received command is executed. Alternatively, if the SNR is less than the predetermined threshold ("No" in operation 1011), a determination is made that the user does not intend to input a voice command. Then, the process returns to the waiting state in operation 1001 and waits to receive the next voice.

Figure 11:
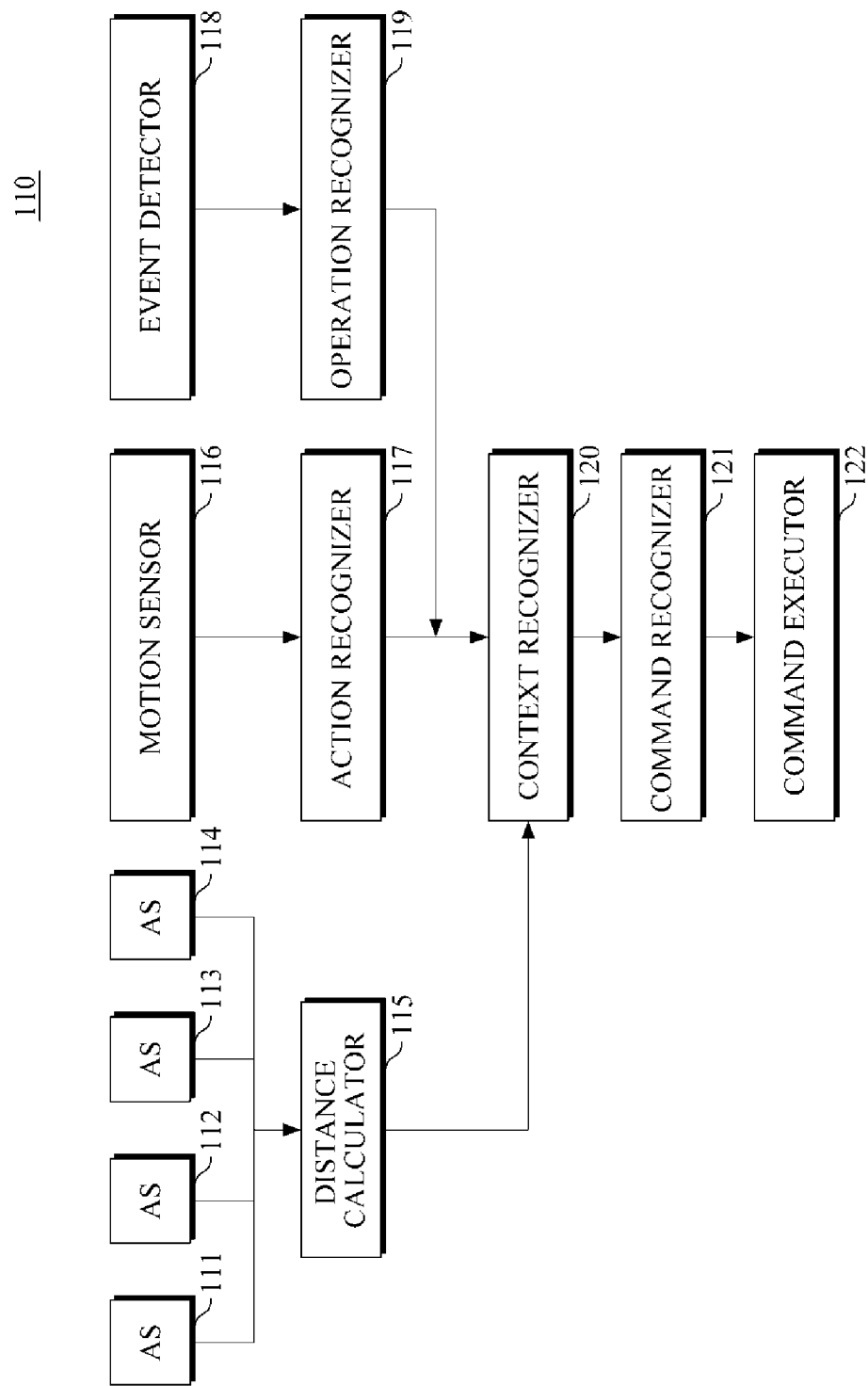
FIG. 11 is a block diagram illustrating another example of a voice command recognition apparatus, in accordance with an embodiment.

FIG. 11 is a block diagram illustrating another example of a voice command recognition apparatus, in accordance with an embodiment. In this example, the apparatus activates a voice command recognition function by determining a specific user's intention based not only on a specific user's intention, but also on a user's action. An apparatus 110 to recognize a voice command, shown in FIG. 11, includes audio sensors (ASs) 111, 112, 113, and 114, a distance calculator 115, a motion sensor 116, an action recognizer 117, an event detector 118, an operation recognizer 119, a context recognizer 120, a command recognizer 121, and a command executor 122. The voice command recognition apparatus 110 includes structural components similar to those of the voice command recognition apparatus 20 shown in FIG. 2, except for the motion sensor 116, the action recognizer 117, the event detector 118, the operation recognizer 119, and the context recognizer 120.

In FIG. 11, the distance calculator 115 calculates a user-apparatus distance from a voice signal received at the audio sensors 111, 112, 113, and 114. The movement recognizer 117 recognizes a user's movements based on a movement of a device, such as a mobile terminal, detected by the motion sensor 116. The operation recognizer 119 recognizes an operation of the device based on the event occurrence of the device detected by the event detector 118. The context recognizer 120 recognizes the user's context by combining the user-apparatus distance calculated by the distance calculator 115, the user's movement recognized by the movement recognizer 117, and the operation recognized by the operation recognizer 119.

For example, the context recognizer 120 determines that a user-apparatus distance is short or below a distance threshold, that a user's actions of using the apparatus does not largely deviate from an action of inputting a voice command, and that an operation of the apparatus indicates the user is in a situation allowing a voice command to be used. In this case, the context recognizer 120 activates the command recognizer 121, and then a command recognized by the command recognizer 121 is executed by the command executor 122.

In this example, in a waiting state, only the audio sensors 111, 112, 113, and 114 may be activated, while other components remain inactive. If a recognizable human voice is received by the audio sensors 111, 112, 113, and 114, the distance calculator 115, the movement/action recognizer 117, and/or the operation recognizer 119 may be activated. Then, the context recognizer 120 activates the command recognizer 112 when a user-apparatus distance is short enough and the user's movement and the operation are able to use a voice command. Accordingly, there is provided an apparatus that directly recognizes a voice command based on a received voice, a user's movements, and a device's operation, without using an additional trigger command.

Figure 12:
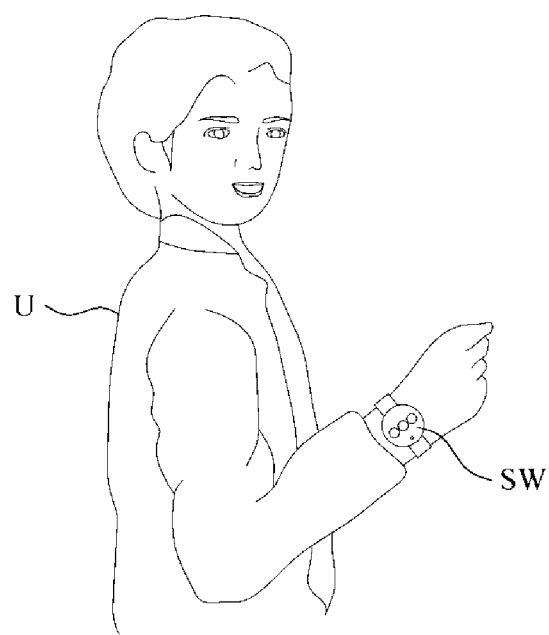
FIG. 12 is a diagram illustrating an embodiment of the voice command recognition apparatus shown in FIG. 11, in accordance with an embodiment.

FIG. 12 is a diagram illustrating an embodiment of the voice command recognition apparatus, shown in FIG. 11. In FIG. 12, a user U raises an arm having a smart watch (SW) worn thereon toward a face. In this example, without using an additional trigger command, the user U produces a voice command toward the smart watch (SW) to check if there are any messages received. The smart watch (SW) calculates a user-apparatus distance from a voice signal received at audio sensors embedded in the smart watch (SW), recognizes that the user has raised an arm by using a motion sensor, and recognizes an operation by detecting an application being executed therein. Then, the smart watch (SW) determines that the currently received voice is input by a user with intention of inputting a voice command, and activates a process of recognizing a voice command.

Figure 13:
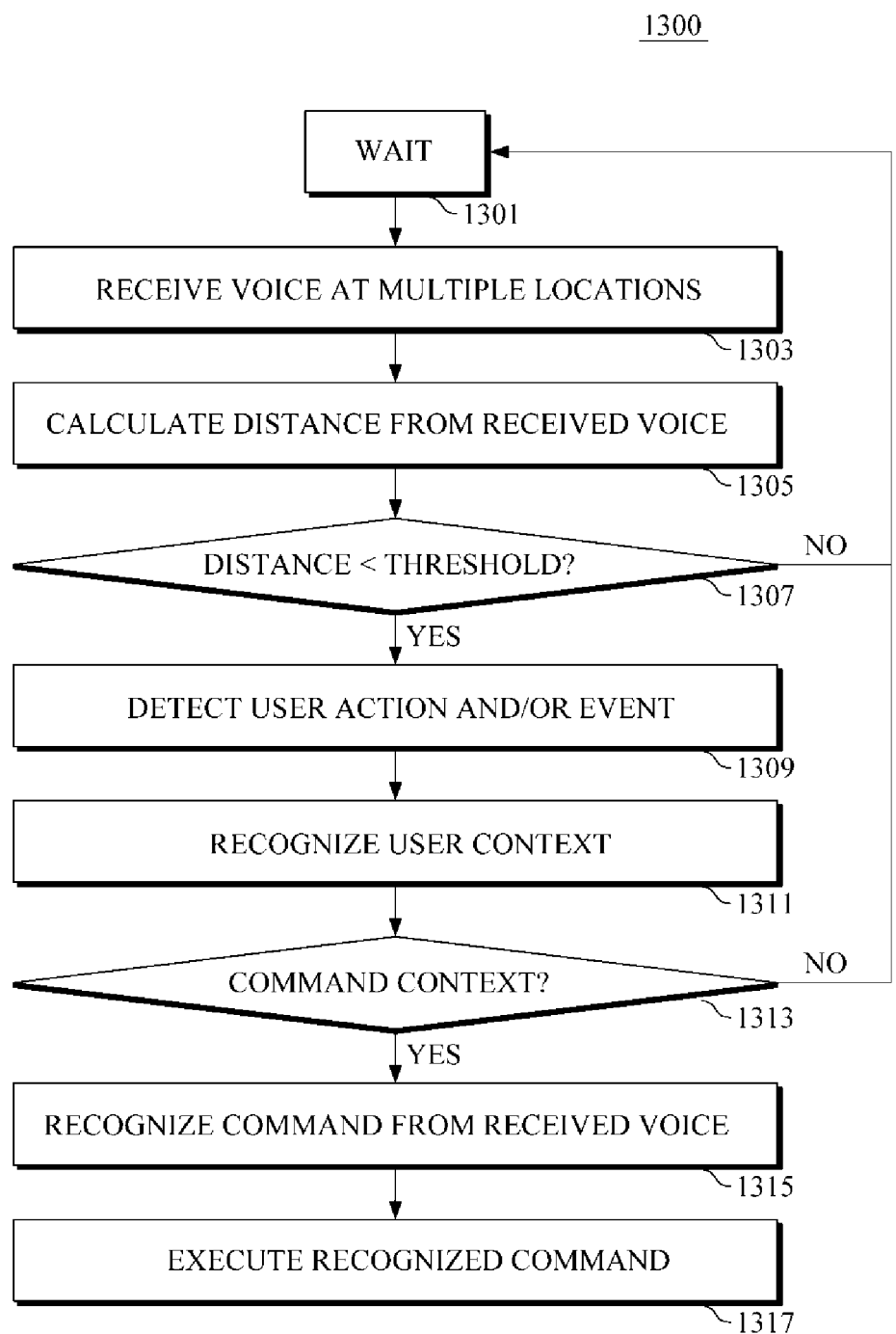
FIG. 13 is a flowchart illustrating another example of a voice command recognition method, in accordance with an embodiment.

FIG. 13 is a flowchart illustrating another example of a voice command recognition method, in accordance with an embodiment. In FIG. 13, the voice command recognition method enables determination of an intention of a user based on a user-apparatus distance, movements of the user, and/or an operation of a device. A method 1300 to recognize a voice command, at operation 1301, starts out in a waiting state in which a process of recognizing a voice command is inactive. In the waiting state at operation 1301, a plurality of voice receiving sensors remain in a state ready to receive a voice signal.

If a user speaks, at operation 1303, the user's voice is received, for instance, almost simultaneously at the audio sensors fixed at different locations. Then, at operation 1305, a user-apparatus distance is calculated from the received voice. If the user-apparatus distance is less than a predetermined threshold ("Yes" in operation 1307), at operation 1309, the user's movement and/or a device's event is detected. If the user-apparatus distance is greater than the predetermined threshold ("No" in operation 1307), the process returns to the waiting state of operation 1001 and waits to receive a subsequent voice signal.

In operation 1311, the user's context is recognized based on the user's movement and/or the device's operation recognized in operation 1309. If a determination is made based on the recognized context of the user that the user intends to input a voice command ("Yes" in operation 1313), in operation 1315, a process of recognizing a command from the currently received voice is activated. Then, at operation 1317, the recognized command is executed. Alternatively, if a determination is made based on the recognized context of the user that the user does not intend to input a voice command ("No" in operation 1313), the process returns to the waiting state of operation 1301 and waits to receive the next voice.

Referring to FIGS. 1 to 13, there are described embodiments in which a user's intention is determined based on a user's context that includes a user-apparatus distance and a process of recognizing a voice command that is activated. Although the above-described embodiments take examples a mobile terminal having a plurality of audio sensors embedded therein and a wearable terminal, aspects of the present disclosure are not limited thereto. A voice command recognition apparatus, according to an exemplary embodiment, may vary as long as the voice command recognition apparatus receives a voice from a user and includes sensors for receiving the voice, a processor for signal processing, and a memory. For example, the voice command recognition apparatus may be various examples, such as mobile terminals, wearable devices, computing devices, audio devices, televisions, desktops, tablet PCs, laptops, set-top boxes, game consoles, and air-conditioning.

Components of the above-described voice command recognition apparatus may be implemented by hardware including a circuit, a processor, or a controller configured to execute a specific function. Alternatively, components of the above-described voice command recognition apparatus may be implemented by a combination of components of a computing device, which may include a processor, a memory, a user inputting device, and a presentation device. The memory is a computer-readable storage medium that stores computer-implementable software, applications, program modules, routines, instructions and/or data, which are encoded to perform a specific task in response to execution led by a processor. The user inputting device may be a device that allows a user to input a command for instructing the processor to perform a specific task or to input data necessary for the specific task. The user inputting device may include a physical/virtual keyboard, a keypad, key buttons, a joystick, track ball, touch-sensitive inputting means, or a microphone. A presentation device may include a display, a printer, a speaker, or a vibration device.

It is to be understood that in the embodiment of the present invention, the operations in FIGS. 4, 7, and 10 are performed in the sequence and manner as shown although the order of some operations and the like may be changed without departing from the spirit and scope of the described configurations. In accordance with an illustrative example, a computer program embodied on a non-transitory computer-readable medium may also be provided, encoding instructions to perform at least the method described in FIGS. 4, 7, and 10.

Program instructions to perform a method described in FIGS. 4, 7, and 10, or one or more operations thereof, may be recorded, stored, or fixed in one or more non-transitory computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein may be easily construed by programmers skilled in the art to which the embodiments pertain based on and using the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A voice command recognition apparatus, comprising:
   audio sensors placed at different locations in the voice command recognition apparatus;
   a context determiner configured to determine user context based on a voice received at the audio sensors, wherein the context comprises a vocalization from a user; and
   a command recognizer configured to activate to recognize a voice command or remain inactive according to the recognized context,
   wherein the context determiner further comprises
      a user recognizer configured to determine whether the voice is from a pre-stored specific user,
      a distance calculator configured to, in response to a determination that the voice is from the specific user, calculate a distance from the user based on an arrival time of the voice to the audio sensors, and
   wherein the command recognizer is further configured to activate to recognize the voice command or remain inactive according to the calculated distance.

2. The voice command recognition apparatus of claim 1, wherein the context determiner further comprises a distance calculator configured to calculate a distance from the user based on a time the voice reaches the audio sensors,
   wherein the command recognizer is further configured to activate to recognize the command from the voice or remain inactive according to the calculated distance.

3. The voice command recognition apparatus of claim 1, wherein the context determiner further comprises
   a distance calculator configured to calculate a distance from the user based on a time the voice reaches the audio sensors, and
   an ambient noise comparator configured to compare magnitude of difference between the voice and ambient noise,
   wherein the command recognizer is further configured to activate to recognize the command from the voice or remain inactivated according to the difference between the calculated distance and the difference between the voice and the ambient noise.

4. The voice command recognition apparatus of claim 1, further comprising:
   wherein the context determiner further comprises a distance calculator configured to calculate a distance from the user based on the time the voice reaches the audio sensors, and
   a movement recognizer configured to recognize a movement of the user,
   wherein the command recognizer is further configured to activate to recognize the command from the voice or remain inactive according to the calculated distance and the recognized movement.

5. The voice command recognition apparatus of claim 1, further comprising:
   an event detector configured to detect an event,
   wherein the context determiner further comprises
      a distance calculator configured to calculate a distance from the user based on the time the voice reaches the respective audio sensors, and
      a operation recognizer configured to recognize an operation of a device based on the event detected by the event detector, wherein the command recognizer is further configured to activate to recognize the command from the voice or remain inactive to the calculated distance and the recognized operation.

6. The voice command recognition apparatus of claim 1, further comprising:
a motion sensor configured to detect movement; and
an event detector configured to detect an event,
wherein the context determiner is further configured to comprise
 a distance calculator configured to calculate a distance from the user based on the time the voice reaches the audio sensors,
 an action recognizer configured to recognize an action from the user based on the detected movement, and
 an operation recognizer configured to recognize an operation of the device based on the detected event,
wherein the command recognizer is further configured to the recognized action, and the recognized action, activate to recognize the command from the voice or remain inactive according to the calculated distance.

7. A voice command recognition method, comprising:
receiving a voice at audio sensors placed at different locations of a device;
determining user context based on the voice, wherein the context comprises vocalization from a user;
determining whether the voice is from a specific pre-registered user;
in response to a determination that the voice is from the pre-registered user, calculating a distance from the user based on the time the voice reaches the audio sensors,
activating the device to recognize a command from the voice or remaining inactive based on the calculated distance.

8. The voice command recognition method of claim 7,
wherein the determining of context comprises determining a distance from the user based on the time the voice reaches the audio sensors,
wherein the activating or the remaining inactive are based on the calculated distance.

9. The voice command recognition method of claim 7,
wherein the determining of context comprises
 calculating a distance from the user based on the time a voice reaches the audio sensors, and
 comparing magnitude of a difference between the voice and ambient noise,
wherein the activating or the remaining inactive are based on the calculated distance and the difference between the voice and the ambient noise.

10. The voice command recognition method of claim 7,
wherein the determining of context comprises
 calculating a distance from the user based on the time the voice reaches the audio sensors, and
 recognizing an action from the user based on movement detected by a motion sensor,
wherein the activating or the remaining inactive are based on the calculated distance and the recognized action.

11. The voice command recognition method of claim 7,
wherein the determining of context comprises
 determining a distance from the user based on the time the voice reaches the audio sensors, and
 recognizing an operation of the device based on an event detected by an event detector,
wherein the activating or the remaining inactive are based on the calculated distance and the recognized operation.

12. The voice command recognition method of claim 7,
wherein the determining of context comprises calculating
 a distance from the user based on the time the voice reaches the audio sensors,
 recognizing an action from the user based on movement detected by a motion sensor, and
 recognizing an operation of the device based on an event detected by an event detector,
wherein the activating or the remaining inactive are based on the calculated distance, the recognized action, and the recognized operation.

13. A computer program embodied on a non-transitory computer readable medium, the computer program being configured to control a processor to perform the method of claim 7.

14. A voice command recognizing apparatus, comprising:
audio sensors placed at different locations in a device;
a distance calculator configured to calculate a distance from a user based on arrival time of a voice relative to each audio sensor, or a time difference in arrival times relative to all the audio sensors;
a command recognizer configured to activate in response to the calculated distance being within a distance threshold and recognize a voice command from the received voice to control the device;
a context determiner configured to determine user context based on a voice received at the audio sensors; and a user recognizer configured to compare the received voice with a pre-stored voice to determine whether the received voice is from an authorized user, wherein in response to determining that the received voice is from the authorized user, the distance calculator switches from an inactive state to an active state.

15. The voice command recognition apparatus of claim 14,
wherein in response to subsequent vocal sounds being absent after a predetermined period of time, the command recognizer is automatically inactivated to a waiting state.

16. The voice command recognition apparatus of claim 14, further comprising:
an ambient noise comparator configured to extract a signal-to-noise ratio (SNR) from ambient noise and compare a magnitude of the received voice with a magnitude of the ambient noise received along with the received voice.

17. The voice command recognition apparatus of claim 16,
wherein, in response to the SNR being greater than a threshold and the calculated distance being within the distance threshold, the command recognizer is activated.

* * * * *